United States Patent [19]

Haenni

[11] 4,081,085
[45] Mar. 28, 1978

[54] APPARATUS FOR RAISING AND FEEDING FLAT WORKPIECES FROM A STACK

[75] Inventor: Eduard A. Haenni, Zofingen, Switzerland

[73] Assignee: Haennerle A.G., Zofingen, Switzerland

[21] Appl. No.: 754,021

[22] Filed: Dec. 23, 1976

[51] Int. Cl.² .............................................. B65G 59/04
[52] U.S. Cl. ................................ 214/1.6; 214/8.5 D; 271/14; 271/269
[58] Field of Search ............... 214/8.5 D, 1.6, 8.5 C; 271/11, 14, 267, 269

[56] References Cited

U.S. PATENT DOCUMENTS

| | | | |
|---|---|---|---|
| 3,780,884 | 12/1973 | Jones | 214/8.5 D |
| 3,914,154 | 10/1975 | Pfeiffer | 214/8.5 D X |
| 3,977,539 | 8/1976 | Hauschild | 214/8.5 D |

FOREIGN PATENT DOCUMENTS 1,131,462  10/1956  France .............................. 214/8.5 D

*Primary Examiner*—Drayton E. Hoffman
*Assistant Examiner*—George F. Abraham

[57] ABSTRACT

Apparatus comprising a carriage fitted with rollers displaced on a track for picking up and raising single flat workpieces which are lying in a stack, such as sheet metal plates, and for feeding them individually to an adjacent processing station. The apparatus further comprises a lifting device with suction lifters and the carriage equipped with moveable impact arms for the workpiece is displaceable from an initial position near the processing station which is outside the effective range of the lifting device to a loading position under the workpiece which has been lifted by the suction lifters for taking the workpiece over and back to the initial position near the processing station where the workpiece is fed to a plate shears or to a bending press. The impact arms serve to shift each workpiece while resting on the carriage on to the processing station.

4 Claims, 5 Drawing Figures

APPARATUS FOR RAISING AND FEEDING FLAT WORKPIECES FROM A STACK

BACKGROUND OF THE INVENTION

1. Field of the Invention

The present invention relates to an apparatus for picking-up flat workpieces lying in a stack such as sheet metal plates, and for feeding them to a nearby processing station.

In various industries, it is required to be able to lift flat workpieces such as then plates which have a broard expanse but only slight stiffness, from a stack and to feed them individually to a processing station e.g. to plate shears or a press where a cutting or pressing step is carried out. The feed to the processing station is still effected nowadays largely by hand, and in order to avoid this monotonous and labour intensive work, various automatically-working apparatus have been proposed.

2. Description of the Prior Art

It is already known to provide apparatus in which a lifting device, arranged above the stack and equipped with suction lifters, is used for grasping and for raising the uppermost workpiece to a next device for transporting the raised workpiece. The raised workpiece is then grasped by magnetic rollers, which conduct the workpiece to a conveyor for forwarding it to the processing station.

Another known lifting device is provided with pneumatic suckers and is of mobile construction.

All these apparatuses mechanically complicated, require frequent adjustment and work unreliably. Particular difficulties arise in the take-over of the raised workpiece by the magnetic rollers and conducting it to a conveying device which feeds the individual sheet-metal workpieces to the processing station.

Further difficulties arise from the fact that mutual adhesion between the individual sheet-metal workpieces may result in the raising of the uppermost plate being accompanied by raising of the plate lying therebelow.

OBJECT OF THE INVENTION

The object of the present invention is to obviate these disadvantages with the prior art devices and to provide an apparatus by means of which sheet-metal workpieces can be raised individually from stack and fed to the processing station.

SUMMARY OF THE INVENTION

The apparatus, in accordance with the invention, for raising single flat workpieces lying in a stack, for example sheet-metal panels, and for feeding them on conveying means to a nearby processing station for cutting or bending, comprises a lifting device, arranged above the stack and equipped with suction lifters for grasping and raising the uppermost workpiece in the stack. It further comprises, for taking-over, transporting and subsequently feeding the workpiece, a sliding carriage displaceable on a track located above the stack and which extends below the suction lifting device when in the raised position of the lifting device. The carriage, during each workpiece raising operation, is disposed in an initial position lying outside the effective region of the lifting device and, after elevating the workpiece has taken place, is displaceable to a loading position under the workpiece for taking over the workpiece.

The lifting device comprises a lifting frame in which the suction lifters are arranged in parallel rows and the first row of the suction lifters is adapted to be raised independent of the other suction lifters in the remaining rows.

To simplify and facilitate the separation of the uppermost sheet metal or other workpiece from the stack, there may be provided on that side of the frame which is turned to the lifting device, air nozzles through which air is blown into the gap which arises upon the raising of the uppermost workpiece from the stack.

BRIEF DESCRIPTION OF THE DRAWINGS

In order that the invention may be more fully understood, preferred embodiments of the invention will now be described, by way of example, with reference to the accompanying drawings, in which.

DESCRIPTION OF THE PREFERRED EMBODIMENT

Figure 1:
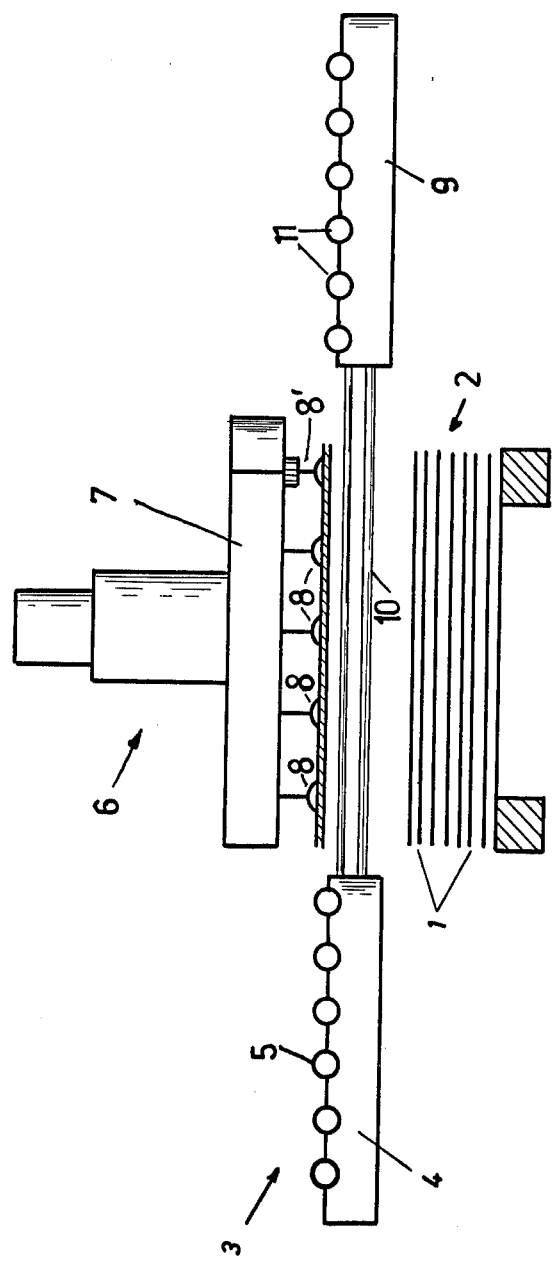
FIG. 1 is a diagrammatic part-sectional elevation of a preferred embodiment of the apparatus of the invention.

Referring firstly to FIG. 1, a stack of flat sheet-metal workpieces 1 is arranged adjacent a processing station 3 provided by a sheet-metal processing apparatus, shown schematically such as a plate shears or a press. A work table 4 of the processing station 3 is equipped with free-running rollers 5 on which each successive sheet-metal workpiece 1 to be processed arrives to be offered directly thereby to processing members (not shown) of the processing apparatus.

A lifting device 6 is arranged over the stack 2 and is equipped with a lifting frame 7 which has suction lifters 8 and 8'.

A sliding carriage 9 is arranged so as to be displaceable in horizontal guides 10 in a plane which lies below the suction lifters 8 and 8' and above the stack 2, in the raised position of the lifting frame 7. In a loading position thereof, the carriage 9 is located beneath the lifting frame 7 and abuts directly against the worktable 4, wheras in an initial position, which is shown in FIG. 1, the carriage 9 is located at the side of the lifting device 6 remote from the table 4 and outside the effective range of movement of the same, so that raising and lowering of the lifting frame 7 and the suction lifters 8, 8' is unimpeded. Furthermore, to assure movement, the carriage 9 is equipped with driven conveying rollers 11.

In its initial position, the carriage 9 is in the right-hand position shown in FIG. 1. For grasping the uppermost sheet-metal workpiece 1 of the stack 2, the lifting frame 7 of the lifting device 6 is lowered and stopped directly above the sheet-metal workpiece stack 2. For separating the uppermost sheet-metal workpiece 1 from the stack, first of all only the suction lifters 8', which are arranged to engage with the workpiece only in the region of one edge therof, are extended to contact the workpiece 1, whereupon by vacuum they raise the said edge of the uppermost from the stack 2.

Thereupon air is blown into the gap thereby formed between the first and second sheet-metal workpiece and the remaining suction lifters 8 are brought into operation. In this way complete separation of the uppermost single sheet-metal workpiece 1 from the rest of the stack 2 is reliably achieved.

Now, the lifting frame 7, together with sheet-metal workpiece 1, is raised and the carriage 9 is brought into the loading position in which it is located directly underneath the sheet-metal piece 1 suspended from the suction lifters 8 and above the stack 2.

The lifting frame 7 is now lowered to such an extent that the sheet-metal workpiece 1 is set down on the conveying rollers 11 of the carriage 9.

The suction lifters 8 are now vented, so that the sheet-metal workpiece 1 is no longer retained by the lifter 7 but rests on the conveying rollers 11. Upon the rollers 11 now being driven, the sheet-metal workpiece 1 is fed onto the worktable 4, where subsequent processing takes place.

Figure 2:
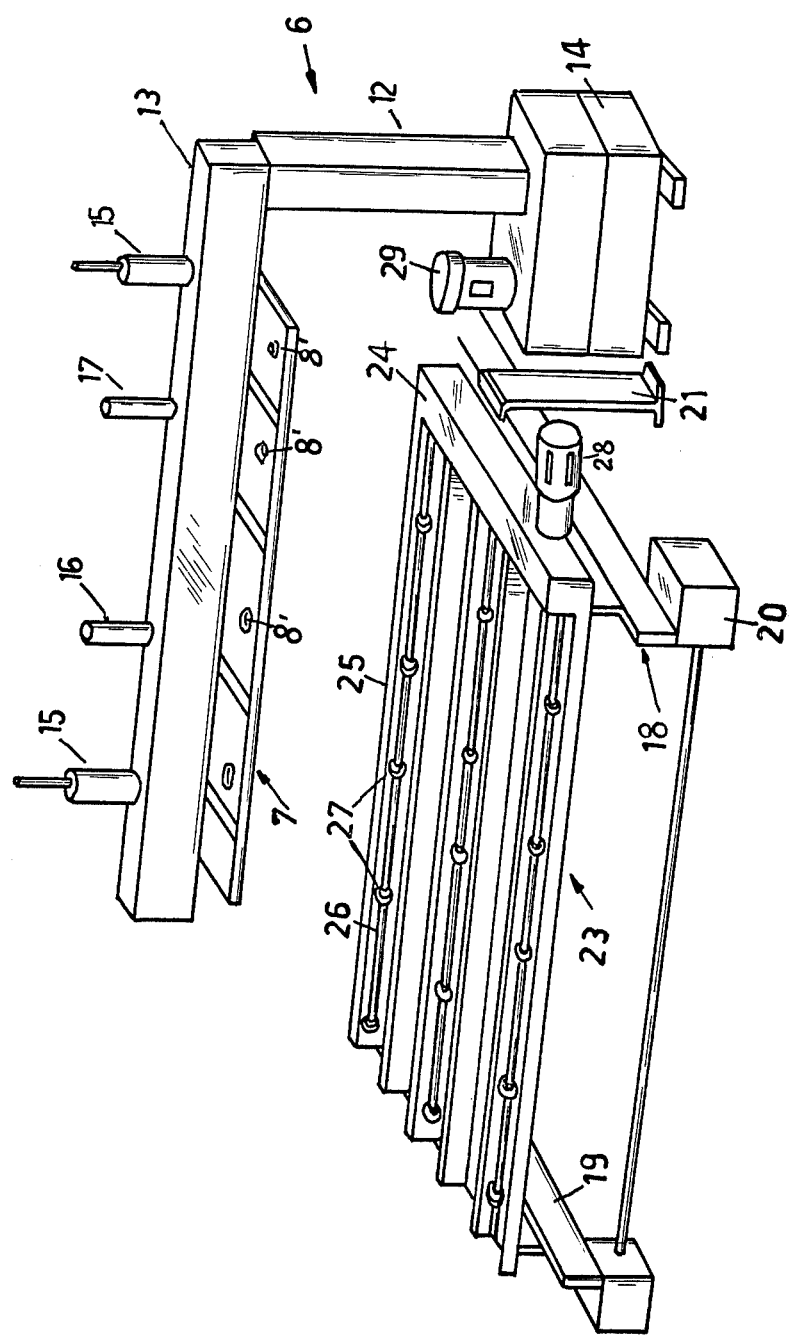
FIG. 2 is a diagrammatic elevation illustrating the essential parts of the apparatus of FIG. 1.

A practical version of the lifting device 6 and the carriage is illustrated diagrammatically in FIG. 2, in which, the same reference numerals as in FIG. 1 are used. The lifting device 6 comprises a cantilever frame which is made up of two vertical beams 12 and one horizontal connecting beam 13 and which is supported in a base 14.

Arranged on the horizontal beam 13 are lifting cylinders 15 by means of which the lifting frame 7 can be lowered and raised. Control of the cylinders 15 can be effected hydraulically or pneumatically using any suitable actuation and control members which are only diagrammatically indicated but not shown in detail.

The suction lifters 8 and 8' are arranged in parallel rows on the frame 7, and as has already been mentioned the foremost row, being of the suction lifters 8', can be raised and lowered independently of the other suction lifters 8. The relevant lifting members 16, 17 are located on the horizontal beam 13.

At that side of the lifting device 6 which is remote from the processing station 3, beneath the suction lifters 8, 8' and above the stack (not shown in FIG. 2), there is a guide 18 which comprises two rails 19 resting on supports 20 or 21 and extending parallel to one another at a spacing which corresponds approximately to the width of the lifting frame 7. The rails 19 extend as far as under the frame 7 and serve to support a carriage 23 which includes a frame 24. Through-shaped struts or braces 25 extend across the frame 24, and in the troughs therof there are shafts 26 fitted with conveying rollers 27. An electric motor 23, which is mounted on the frame 24, serves to drive the shafts 26. A further electric motor 29 is arranged on the base 14 and serves for effecting displacement of the carriage 23. Present furthermore at that side of the frame 24 which is towards the lifting device 7 are air nozzles (not shown), through which air is injected into the gap which arises upon initial raising of one edge of the uppermost sheet in the stack, as has been described previously.

Figure 3:
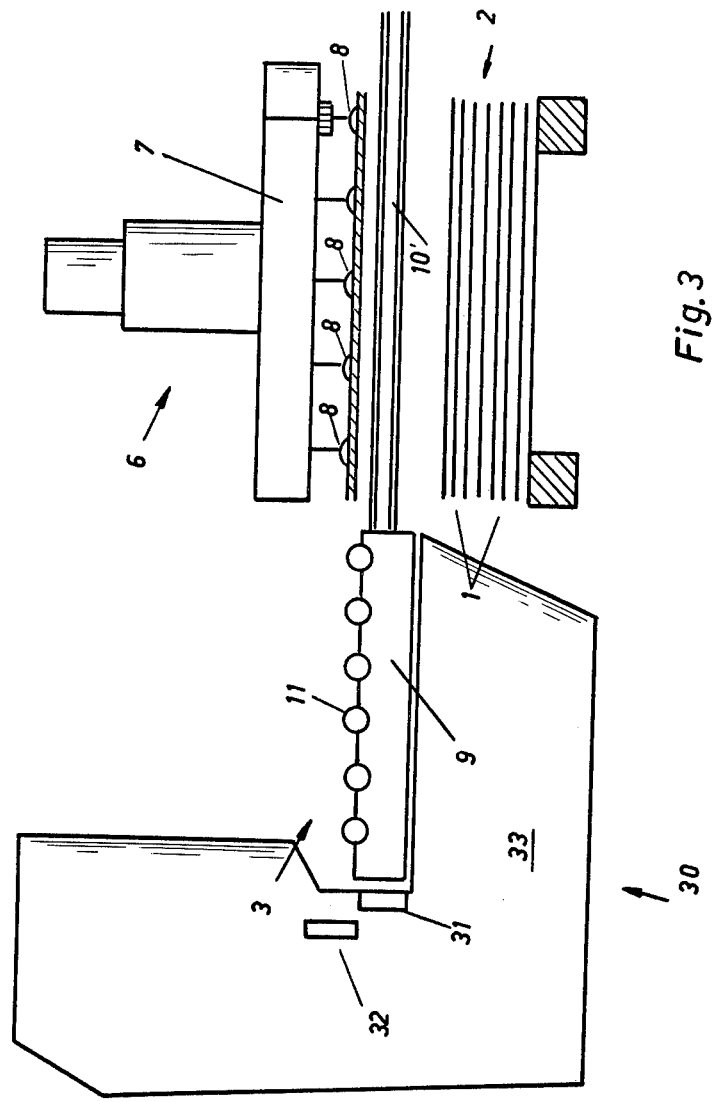
FIG. 3 is a diagrammatic part-sectional elevation illustrating a second embodiment of the apparatus of the invention.

A second embodiment of the apparatus of the invention is illustated in FIG. 3. Designated by the numeral 30 is a sheet processing machine in the form of plate shears which have, in the usual way, a fixed cutting member 31 and a movable cutting member 32. Instead of the customary work table, present on base 33 of the apparatus in place for reception of the carriage 9, which is the one end position is disposed above the stack 2 and beneath the lifting frame 7 and in the other end position, as shown in FIG. 3, is disposed above the upright 33, which is also the initial position.

The uppermost sheet-metal workpiece 1 is raised and the carriage 9 is brought into the position in which it is located directly underneath the sheet-metal piece suspended from the suction lifters 8, in a manner similar to that already described above. The lifting frame 7 is lowered to such an extent that the sheet-metal workpiece 1 can be set down on the conveying rollers 11 of the carriage 9. After venting of the suction lifters 8, the frame 7 is raised and the carriage 9 brought on the guides 10', which now extend to the plate shears, into the position evident from FIG. 3.

The carriage 9 is located in the base 33 of the plate shears in the immediate vicinity of cutting members 31 and 32 therof. Subsequently the rollers 11 are driven, whereby the sheet is brought into the cutting position. The driven rollers act in this instance as a sheet advancing or conveying arrangement. After the cutting operations has been effected, the sheet workpiece 11 is conveyed further to a collecting point behind the shears.

Figure 4:
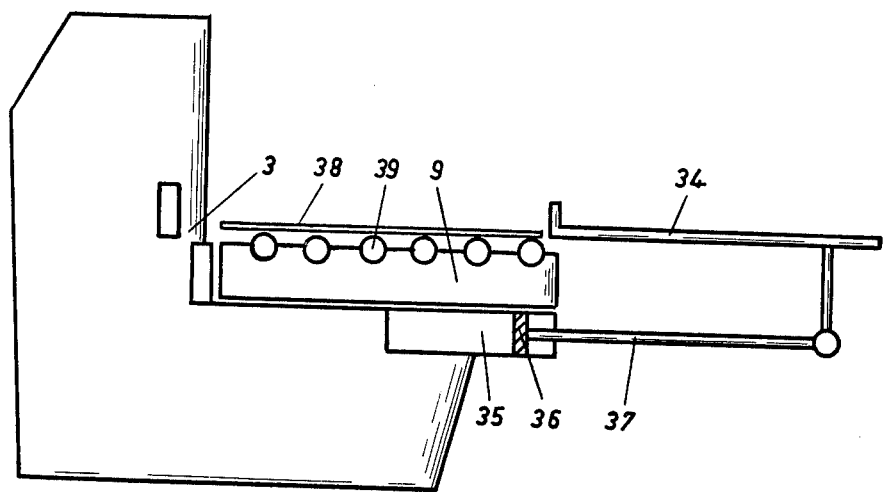
FIG. 4 is a view similar to FIGS. 1 and 3, but illustrating a third embodiment of the apparatus

Circumstances permitting, e.g. in the case of programmed cutting work, it is advantageous if the sheet advance is effected not, or not exclusively, by driven rollers but by use of special impact arms. Such a version is evident from FIG. 4. For this purpose, two impact arms 34 are provided laterally on the carriage 9 and fastened underneath the carriage 9 is a cylinder 35 in which a piston 36 is actuable hydraulically or pneumatically. The impact arms 34 are connected to the piston rod 37. The sheet 38 rests on freely-rotatably-mounted rollers 39. A stop can be present for limiting the sheet advance.

A further variant consists in that both driven rollers 39 and impact arms 34 are present. In this case the sheet-metal workpieces are moved as far as a certain point by the driven rollers towards the processing station 3, whereupon the last portion of the movement up to the knife is accomplished by the sheet-metal workpieces each being displaced by means of the impact arms 34. In many instance, instead of the impact arms, small impact fingers, which are not shown in the drawings, are sufficient.

Figure 5:
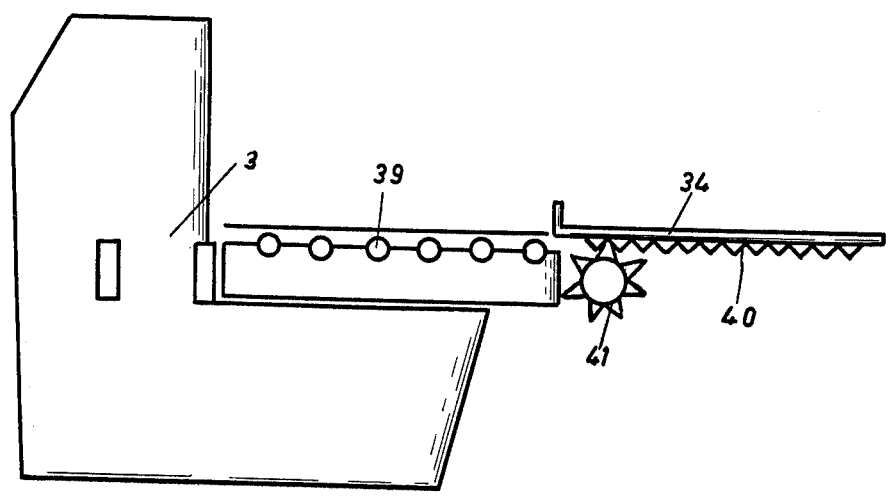
FIG. 5 is a view similar to FIGS. 1, 3 and 4, but illustrating a fourth embodiment of apparatus.

The drive of the impact arms or push arms or push arms 34 can if desired be effected by a toothed rack, as emerges from FIG. 5. The impact arms 34 are equipped with respective toothed racks 40, which are driven by toothed wheels 41.

If a numerical drive is used, then the sheet advance can be undertaken in a particularly precise manner, and the end stop for the advance limitation is abolished. A tongs, arranged on the impact arm effects the arrest of the impact arm. In this case, the drive of the rollers or of the impact arms or both drives may be provided with a numerical control, which allows a displacement of the sheet-metal panels by pre-programmable advance lengths.

With the aid of the described apparatus, the processing station can be fed mechanically and largely automatically, with the individual workpieces, whereby efficiency is increased and costs are substantially lowered.

What is claim is:

1. An apparatus for grasping and raising flat workpieces lying in a stack and for feeding the single workpiece thus raised to an adjacent processing station to a shear or a press, comprising:

a lifting device arranged above said stack;

suction lifters on said lifting device for grasping and raising the uppermost workpiece in a stack;

a track extending below said lifting device and said suction lifters from a first location under the stack of flat workpieces to a second location at the processing station which is outside the range of the lifting device;

a carriage provided with rollers and moveable impact arms being displacable on said track, said carriage including control means operative on said impact arms so that a workpiece which is initially raised and placed by the suction lifters of said lifting device on said rollers is fed to said processing station by the moveable impact arms means to displace said carriage during each workpiece lifting operation while said lifting device is in its raised position whereby said carriage lifting device is displaced on said track from an initial position lying outside the effective region of said lifting device to a loading position after raising of the workpiece has taken place; and said loading position being adjacent the processing station and under the raised workpiece for taking over the workpiece.

2. An apparatus according to claim 1 wherein the control means for the impact arms are hydraulically actuatable piston means which is arranged in a cylinder on the carriage.

3. An apparatus according to claim 1 wherein said driven impact arms are driven by means of toothed wheels which cooperate with toothed racks arranged on said impact arms.

4. An apparatus according to claim 1 wherein some of said rollers are driven rollers which are driven by a roller drive of the impact arms which is provided with a numerical control to allow a displacement of the sheet metal panels by a pre-programmed advance length.

* * * * *